Figure 1:
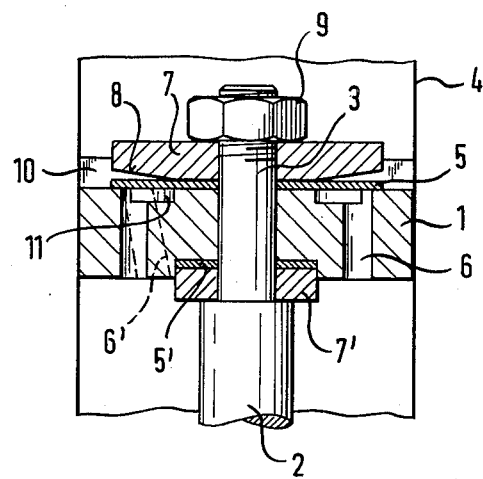

United States Patent [19]
Overkott

[11] 3,957,140
[45] May 18, 1976

[54] SHOCK-ABSORBER PISTON

[75] Inventor: Franz Josef Overkott, Gevelsberg, Germany

[73] Assignee: Carl Ullrich Peddinghaus, Wuppertal-Barmen, Germany

[22] Filed: Feb. 11, 1975

[21] Appl. No.: 549,088

[52] U.S. Cl............................ 188/317; 137/493.8; 188/322
[51] Int. Cl.².......................................... F16F 9/19
[58] Field of Search .......... 188/282, 317, 322, 269; 137/493.8

[56] References Cited
UNITED STATES PATENTS

| | | | |
|---|---|---|---|
| 3,078,965 | 2/1963 | DeCarbon et al. | 188/322 |
| 3,831,626 | 8/1974 | Peddinghaus | 188/317 |

FOREIGN PATENTS OR APPLICATIONS

| | | | |
|---|---|---|---|
| 1,228,982 | 9/1960 | France | 188/322 |
| 1,249,100 | 8/1967 | Germany | 188/322 |
| 2,132,605 | 1/1972 | Germany | 188/282 |
| 1,242,056 | 6/1967 | Germany | 188/322 |
| 709,338 | 5/1954 | United Kingdom | 188/322 |
| 472,033 | 6/1952 | Italy | 188/322 |

Primary Examiner—Trygve M. Blix
Assistant Examiner—Edward R. Kazenske
Attorney, Agent, or Firm—Finnegan, Henderson, Farabow & Garrett

[57] ABSTRACT

A shock-absorber piston of the kind having diametrically opposed valve ports which are adapted to be obturated by a resilient valve plate which can be deflected to an open position against a supporting plate. The valve plate and supporting plate are at least partly accommodated within a groove formed in an axial end face of the piston. The groove extends across the whole diameter of the piston and the inner face of the supporting plate is accommodated wholly within said groove.

6 Claims, 3 Drawing Figures

SHOCK-ABSORBER PISTON

This invention relates to a shock-absorber piston of the kind which is secured to one end of a piston rod and which has diametrically opposite valve ports adapted to be obturated by means of at least one resilient valve plate whereof movement of the piston in its co-acting cylinder in a direction which tends to open said ports is limited by a supporting plate having planar engagement with the valve plate in its middle region whilst the marginal regions of said supporting plate are chamfered to slope away from the piston, the thickness of said supporting plate being at least partially accommodated within a groove formed in the piston.

A shock absorber piston of this kind is described in German OS 2 154 389. In this known arrangement, when the resilient valve plates (i.e., one on each axial face of the piston) deflect and eventually engage with the respective supporting plates, the narrow-sided walls of the containing grooves produce flow passages designed to affect the absorbtion characteristics of the shock absorber device in a specific way. The dimensions of the flow passages cross-section are important because this affects the resistance to flow (dynamic resistance) of the shock absorber piston. In this arrangement, the hydraulic current emerges from the piston on movement of the latter, in an axial direction and thereby produces an agitation in the adjacent absorber fluid whereby the outflow energy from the piston is eventually destroyed. However, in this arrangement the current in the absorber fluid is comparatively irregular and, more particularly, tends to cause strong surface turbulence in the absorber fluid which is a serious disadvantage in the event of the shock absorber piston being part of a hydropneumatic absorber device wherein the turbulent surface of the absorber fluid is liable to absorb gas under pressure from the compensation chamber, thus giving rise to cavitation phenomena during subsequent passage through the valve ports of the piston.

The present invention has therefore for one of its objects to provide an improved shock absorber piston in which a substantially uniform flow condition is established in the adjacent absorber-fluid -containing chamber following the emergence of absorber fluid from the valve ports of the piston as the piston moves in use, particularly for the purpose of counteracting, or preventing, the absorption of gas under pressure by the shock absorber fluid in hydropneumatic shock absorber units.

According to the invention, there is provided a shock absorber piston having diametrically opposed valve ports adapted to be obturated by means of a rectangular resilient valve plate whereof an operative deflection of said valve plates to open said ports is limited by a supporting plate having planar engagement with said valve plate in its central region and having its end portions chamfered to slope away from the piston, the thickness of said supporting plate being at least partly accommodated within a groove receiving the valve plate characterized in that said groove extends across the whole diameter of the piston, and in that the inner face of said supporting plate is accommodated wholly within said groove.

In contrast with the initially described known shock absorber piston, the arrangement according to the present invention involves an outflow from the piston in use in directions towards the interior cylinder walls. This alone, however, would not suffice to establish an even flow condition within the adjacent chamber. The vital factor for this resides in that the aforesaid piston groove extends between the cylinder walls and in that the resilient valve plate in its open position, co-act with the groove to provide flow passages of rectangular cross-section wherein a sufficiently high rate, or speed, of flow obtains to maintain a predetermined state of flow even when this flow or current is deflected at the adjacent cylinder wall and continues along said wall in a direction opposite to the direction of movement of the shock absorber piston. Eventually this flow along the cylinder wall is redirected in the opposite direction in the central region of the cylinder to return once more to the piston.

The dynamic flow conditions characterized in this way will become established in the same manner virtually within the entire speed range of the shock absorber piston which is normally applicable to motor vehicle shock absorber devices. Consequently, the proportional amount of energy destroyed by the flow of absorber fluid remains constant and, in particular, the comparatively calm surface level of the absorber fluid allows only very small amounts of gas under pressure to be adsorbed by the fluid so that the overall shock absorption effect remains uniform.

In order to fill as completely as possible the flow-passages provided in the manner hereinbefore described and through which the hydraulic currents flow in directions towards the cylinder walls, the valve ports are conveniently arranged in laterally adjacent pairs. Still more even filling, or charging, conditions for the said passages are then achieved by arranging for those ends of the valve ports adjacent to the associated resilient valve plate to be in mutual communication by means of pocket-like recesses formed in the base wall of the piston groove. This arrangement leads to a combining of the outflow currents from the valve ports even before these enter into the said passages. The pocket-like recesses in this arrangement advantageously extend in the direction towards the centre of the associated valve plate so that full obturation by the valve plate will be ensured in th closed position of the latter even with larger recesses of the kind mentioned.

Figure 2:
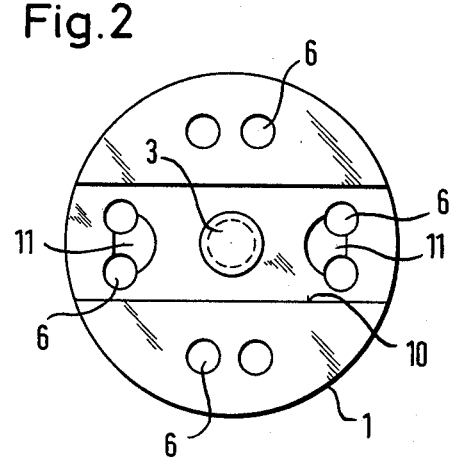
Figure 3:
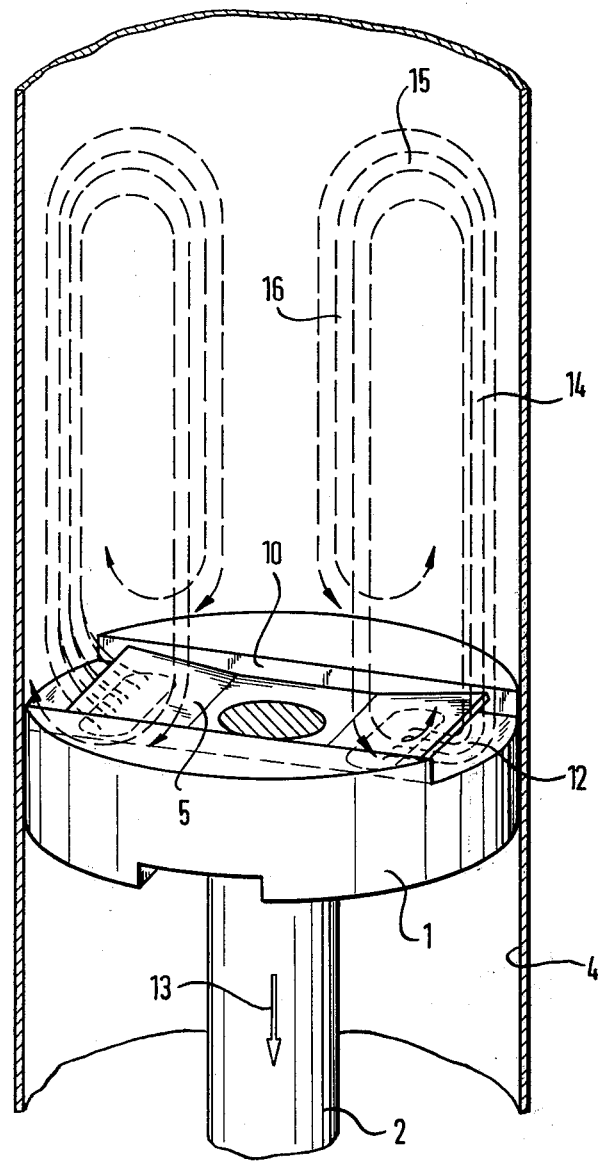

For further understanding of this invention reference is made to the accompanying drawings wherein FIG. 1 is a longitudinal section through one example of a shock absorber piston in accordance with the invention, FIG. 2 is a plan view from above of the piston seen in FIG. 1 but without the valve plates and supporting plate, and FIG. 3 is a perspective view illustrating the flow conditions achieved in use with the shock absorber piston shown in FIGS. 1 and 2.

As shown in FIG. 1, the shock absorber piston 1 having two sets of valve ports 6 is mounted on a stepped terminal portion 3 of a piston rod 2 in a cylinder of which only the interior walls 4 are shown. As can be seen from FIG. 2, each set of valve ports comprise two pairs of ports, one pair being disposed diametrically opposite to the other pair. Furthermore, one set is angularly displaced through an angle of 90° with respect to the other set.

Each set of valve ports 6 is obturated by means of a resilient valve plate 5 or 5' whereof operative movement by way of a deflection to open the associated ports is limited by a supporting plate 7 or 7' or, more specifically, by the portions 8 at the ends of said plate 7 or 7' which slope away from the piston 1. The piston is threadedly secured on the piston rod 2 by means of a nut 9. The lower supporting plate 7', bears direct on the shoulder between the stepped portion 3 and the remaining part of the piston rod 2 and limits the movement of the resilient valve plate 5'.

FIG. 1 shows that the resilient valve plate 5 and the inner or lower face of the supporting plate 7 are wholly and fully accommodated within a groove 10 which extends continuously across the piston to the inner wall 4 of the cylinder. A similar comment applies to plates 5' and 7'. This means that even when the valve plates are fully deflected the current flowing through the associated valve ports 6 will only occupy and fill flow passages of rectangular cross-section open in directions towards the inner wall 4 of the cylinder. The valve ports 6 forming each pair of each set of ports communicate with one another by pockets 11 formed in those portions of the piston 1 which are situated adjacent to the resilient valve plates 5. On the inlet side however the pairs of valve ports 6 open directly into the end face of the piston which is not recessed by a pocket 11 as may be observed from FIG. 2. The resilient valve plate 5, the supporting plate 7 and the piston nut 9 are omitted from FIG. 2 in order to provide a direct plan view of one face of the piston.

FIG. 3 represents a fragmentary perspective view showing flow patterns but for clarity the piston rod portion 3, the supporting plate 7 and the piston rod nut 9 have been omitted from the top of the piston and the plates 5' and 7' from the bottom of the piston. The piston 1 is of course mounted at the end of the piston rod 2 and is guided by the inner wall 4 of the cylinder in conventional manner. This figure merely shows the resilient valve plate 5 in the upper groove 6 said plate being shown in its disengaged or deflected position. In consequence, a flow-passageway is formed having a rectangular cross-section 12 through which the hydraulic current impinges directly against the cylinder wall 4 when the piston rod 2 descends in the direction of the arrow 13. The current is deflected at the cylinder wall and then flows upwardly to the region 14, eventually to be subject, still within the absorber fluid, to a direction change 15, subsequently to which the flow in the central region 16 returns once more to the piston to re-enter the flow-circuit.

The drawings illustrate one particular example of a shock absorber piston in accordance with the invention. However, a satisfactory result may be obtained by applying the principles of this invention merely to one of the end faces of the piston, namely to that axial end facing the compensation or equalizing chamber for the absorber fluid displaced by the piston rod 2.

The designed flow behaviour may be improved still further by arranging for the valve ports, instead of extending axially through the piston 1, to extend angularly or at an inclination to the piston axis so that the outflow emerging therefrom will already embody a component directed towards the cylinder wall and merely require a partial subsequent direction change. Such a valve port is represented in broken lines at 6' in FIG. 1.

I claim:

1. A piston for a shock absorber comprising a piston body having spaced axial end faces and a side wall extending therebetween, a piston rod secured to said piston body, opposed valve ports in said body, a groove formed in each of the axial end faces of said piston body, a pair of said ports opening into the groove formed in one end face of said piston body and opening through the other end face of said piston body at a location spaced from the groove formed in said other face, a second pair of said ports opening into the groove formed in said other end face of said piston body and opening through said one end face at a location spaced from the groove formed in said one end face, resilient valve plates lying wholly within said grooves respectively and overlying the ports opening into said grooves, and rigid support plates, each having an inner face received in a corresponding groove, said support plates having central regions engaging the respective valve plates and end regions adapted to limit opening movement of the respective resilient valve plates with respect to the underlying parts, each said supporting plate having a length at least the same length as its corresponding valve plate, each of said grooves being greater in length than the length of the corresponding supporting plates, said grooves extending completely across the diameter of the axial end faces of the piston body to open through the side wall thereof.

2. A piston for a shock absorber containing a fluid comprising a piston body having spaced axial end faces and a side wall extending between said end faces, a piston rod secured to said piston body, a substantially diametrically extending groove formed in one of the axial end faces of said body, substantially diametrically opposed valve ports through said body with said ports opening into the groove in said one axial end face and on respective opposite sides of the axis of said piston body, a resilient valve plate disposed wholly within said groove with opposite end portions thereof overlying said ports respectively, a rigid support plate overlying said valve plate and having a central portion engaging a central portion of said valve plate, means carried by said support plate adjacent its opposite ends to limit opening movement of the valve plate end portions with respect to the underlying ports, said support plate having a length at least as great as the length of said valve plate, said groove being greater in length of said support plate and extending completely across the diameter of said axial end face to open through the side wall of said piston body at diametrically opposed locations.

3. A shock absorber according to claim 2 wherein said valve ports comprise two pairs of ports, one pair being disposed diametrically opposite to the other pair with each pair opening into said groove along said one axial face.

4. A shock absorber according to claim 3 including means defining a pair of recesses in the base of said groove at diametrically opposed positions, each pair of valve ports adjacent the valve plate lying in communication with the corresponding recess.

5. A shock absorber according to claim 4 wherein said recesses extend from said valve ports radially inwardly towards the middle region of the associated valve plate and wholly underlie such valve plate end portions.

6. A shock absorber according to claim 2 wherein said valve ports extend through the piston body in directions inclined to the piston axis and in a radially outward direction to provide a radially outward fluid flow component.

* * * * *

UNITED STATES PATENT AND TRADEMARK OFFICE
CERTIFICATE OF CORRECTION

PATENT NO. : 3,957,140
DATED : May 18, 1976
INVENTOR(S) : Franz Josef Overkott

It is certified that error appears in the above-identified patent and that said Letters Patent are hereby corrected as shown below:

Claim 1, column 4, line 6, after "other" insert --end--.

Signed and Sealed this

Second Day of November 1976

[SEAL]

Attest:

RUTH C. MASON
Attesting Officer

C. MARSHALL DANN
Commissioner of Patents and Trademarks